US011711812B2

United States Patent

(12) United States Patent
Wang et al.

(10) Patent No.: US 11,711,812 B2
(45) Date of Patent: Jul. 25, 2023

(54) METHOD AND APPARATUS FOR CONFIGURING UPLINK SIGNAL, AND METHOD AND APPARATUS FOR DETERMINING UPLINK SIGNAL

(71) Applicant: ZTE Corporation, Shenzhen (CN)

(72) Inventors: Yuxin Wang, Shenzhen (CN); Zhaohua Lu, Shenzhen (CN); Yu Ngok Li, Shenzhen (CN); Yijian Chen, Shenzhen (CN); Chuangxin Jiang, Shenzhen (CN); Yong Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/610,996

(22) PCT Filed: Jun. 12, 2018

(86) PCT No.: PCT/CN2018/090726
§ 371 (c)(1),
(2) Date: Nov. 5, 2019

(87) PCT Pub. No.: WO2018/202215
PCT Pub. Date: Nov. 8, 2018

(65) Prior Publication Data

US 2020/0107304 A1 Apr. 2, 2020

(30) Foreign Application Priority Data

May 5, 2017 (CN) ......................... 201710313874.6

(51) Int. Cl.
*H04W 72/04* (2023.01)
*H04L 5/00* (2006.01)
(Continued)

(52) U.S. Cl.
CPC ........... *H04W 72/23* (2023.01); *H04L 5/0005* (2013.01); *H04L 5/0048* (2013.01); *H04W 72/044* (2013.01)

(58) Field of Classification Search
CPC ... H04L 5/0053; H04L 5/0007; H04L 5/0048; H04L 5/0005; H04W 72/0453; H04W 72/042; H04W 72/044
See application file for complete search history.

(56) References Cited

U.S. PATENT DOCUMENTS

2010/0111007 A1* 5/2010 Suo ........................ H04L 5/0005 375/132
2011/0199944 A1* 8/2011 Chen ..................... H04L 5/0057 370/280
(Continued)

FOREIGN PATENT DOCUMENTS

CN 101541029 A 9/2009
CN 102013952 A 4/2011
(Continued)

OTHER PUBLICATIONS

International Search Report for corresponding application PCT/CN2018/090726 filed Jun. 12, 2018; dated Aug. 16, 2018.
(Continued)

*Primary Examiner* — Atique Ahmed
(74) *Attorney, Agent, or Firm* — Cantor Colburn LLP

(57) ABSTRACT

Provided a method for configuring an unlink signal. The method includes: indicating, by a first communication node through signaling, a resource or a frequency hopping manner used by a second communication node for transmitting the uplink signal, or predefining, by the first communication node and the second communication node, the resource or the frequency hopping manner used by the second communication node for transmitting the uplink signal. Further provided are an apparatus for configuring an uplink signal,
(Continued)

a method and apparatus for determining an uplink signal, a base station, a terminal and a storage medium.

12 Claims, 2 Drawing Sheets

(51) Int. Cl.
*H04W 72/23* (2023.01)
*H04W 72/044* (2023.01)

(56) References Cited

U.S. PATENT DOCUMENTS

| | | | | |
|---|---|---|---|---|
| 2012/0106471 | A1* | 5/2012 | Behravan | H04L 5/0094 370/329 |
| 2013/0010722 | A1* | 1/2013 | Suzuki | H04W 72/04 370/329 |
| 2013/0163534 | A1* | 6/2013 | Anderson | H04W 72/0446 370/329 |
| 2013/0242911 | A1* | 9/2013 | Heo | H04L 5/0048 370/329 |
| 2013/0250847 | A1* | 9/2013 | Lee | H04L 5/0007 370/315 |
| 2015/0139006 | A1* | 5/2015 | Seo | H04J 11/005 370/252 |
| 2015/0195063 | A1 | 7/2015 | Ro et al. | |
| 2017/0064694 | A1* | 3/2017 | Wang | H04W 72/044 |
| 2017/0207815 | A1* | 7/2017 | Chae | H04L 5/00 |
| 2017/0245313 | A1* | 8/2017 | Kim | H04W 76/14 |
| 2018/0316532 | A1* | 11/2018 | Tie | H04L 27/26 |
| 2018/0332579 | A1* | 11/2018 | Kang | H04W 72/566 |
| 2020/0059332 | A1* | 2/2020 | Takeda | H04L 5/0053 |
| 2020/0204407 | A1* | 6/2020 | Liu | H04L 25/0226 |

FOREIGN PATENT DOCUMENTS

| | | | |
|---|---|---|---|
| CN | 102404854 | A | 4/2012 |
| CN | 108112076 | A | 6/2018 |
| WO | 2010124588 | A1 | 11/2010 |
| WO | 2012167589 | A1 | 12/2012 |
| WO | 2014003313 | A1 | 1/2014 |

OTHER PUBLICATIONS

Institute for Information Industry (III); "SRS Resource Reused for D2D Discovery" 3GPP TSG-RAN WG1 Meeting #74BIS, RL-134287 (Oct. 2013) 4 pages.

Office Action issued in Chinese Patent Application No. 201710313874.6; Application Filing Date May 5, 2017; dated Dec. 28, 2022 (14 pages).

Search Report issued in Chinese Patent Application No. 201710313874 6; Application Filing Date May 5, 2017; dated Dec. 20, 2022 (6 pages).

* cited by examiner

METHOD AND APPARATUS FOR CONFIGURING UPLINK SIGNAL, AND METHOD AND APPARATUS FOR DETERMINING UPLINK SIGNAL

CROSS REFERENCE TO RELATED APPLICATIONS

This is a National Stage Application, filed under 35 U.S.C. 371, of International Patent Application No. PCT/CN2018/090726, filed on Jun. 12, 2018, which claims priority to Chinese patent application No. 201710313874.6 filed on May 5, 2017, contents of both of which are incorporated herein by reference in their entireties.

TECHNICAL FIELD

The present disclosure relates to the field of communications and, for example, to a method and apparatus for configuring an uplink signal, and a method and apparatus for determining an uplink signal.

BACKGROUND

In Long Term Evolution (LTE), a physical downlink control channel (PDCCH) is configured to bear uplink and downlink scheduling information and uplink power control information. A format of downlink control information (DCI) includes format 0, format 1, format 1A, format 1B, format 1C, format 1D, format 2, format 2A, format 3, format 3A and the like of the DCI and format 2B, format 2C, and format 2D of the DCI are added in LTE-Advanced (LTA-A) Release 12 to support a variety of different applications and transmission modes. A first communication node (an evolved-Node-B (eNB)) may configure a second communication node device (a user equipment (UE)) through the downlink control information, or the second communication node device accepts configurations of higher layers, also referred to as configuring the UE through higher layer signaling.

A sounding reference signal (SRS) is a signal used between the second communication node device and the first communication node for measuring channel state information (CSI). In the LTE system, the UE periodically transmits an uplink SRS on a last data symbol of a transmission sub-frame according to parameters, indicated by the eNB, such as a frequency band, a frequency domain position, a sequence cyclic shift, a period, and a sub-frame offset. The eNB determines uplink CSI of the UE according to the received SRS, and performs operations such as frequency domain selection and scheduling and closed loop power control according to the CSI. A study of LTE-A Release 10 proposes that in uplink communications, a non-precoded SRS, that is, an antenna-specific SRS, should be used for precoding a demodulation reference signal (DMRS) of a physical uplink shared channel (PUSCH). The first communication node can estimate original uplink CSI through the received non-precoded SRS, and cannot estimate the original uplink CSI through the precoded DMRS. In this case, when the UE transmits the non-precoded SRS by using multiple antennas, more SRS resources are required by each UE, which results in a decrease in the number of UEs that can be simultaneously multiplexed in the system. The UE may transmit the SRS in two triggering manners, that is, the higher layer signaling (also referred to as trigger type 0) or the downlink control information (also referred to as trigger type 1). A periodic SRS is triggered through the high-layer signaling, and an aperiodic SRS is triggered through the downlink control information. In LTE-A Release 10, an aperiodic transmission mode of the SRS is added, which improves a utilization rate of SRS resources and improves flexibility of resource scheduling.

With the development of communication technologies, the demand for data traffic is increasing and available low-frequency carriers are in short supply. Therefore, high-frequency (30 to 300 GHz) carrier communications which have not been fully utilized have become an important communication way of providing high-speed data communications in the future. The high-frequency carrier communications have large available bandwidth and can provide effective high-speed data communications. However, the high-frequency carrier communications face a big technical challenge that high-frequency signals are attenuated significantly in space compared with low-frequency signals. Therefore, the high-frequency signals face the problem of spatial attenuation losses when used for outdoor communications. However, due to the shorter wavelength of the high-frequency signals, generally more antennas may be used, so that the spatial attenuation losses can be compensated through beam-based communications.

However, when the number of antennas increases, each antenna needs a set of radio frequency links, and digital beamforming thus causes increased costs and power losses. Therefore, the related art tend to study hybrid beamforming, that is, a beam formed by a radio frequency beam with a digital beam.

In a study of the new radio access technology (RAT), in a high-frequency communication system, the first communication node will configure a large number of antennas to form downlink transmission beams for compensating the spatial attenuation of the high-frequency communications, and a second communication node, the UE, will configure a large number of antennas to form uplink transmission beams. In this case, the SRS will also be transmitted by using beams. In the future SRS study, in order to enhance an SRS multiplexing capacity, a plurality of uplink symbols may be configured in one timeslot or one sub-frame for an SRS transmission, and in order to increase a power spectral density of the SRS transmission of a user, a frequency hopping manner will be used for the SRS transmission. When the SRS occupies the plurality of uplink symbols and is transmitted in the frequency hopping manner, how to implement the SRS transmission in the frequency hopping manner between frequency domain and the beams and how to transmit uplink data on the plurality of uplink symbols occupied by the SRS to improve the utilization rate of time-frequency resources is a problem to be solved.

SUMMARY

Embodiments of the present application provide a method and apparatus for configuring an uplink signal, and a method and apparatus for determining an uplink signal, to solve at least the problem of how to transmit the uplink signal in a new system.

An embodiment of the present application provides a method for configuring an uplink signal. The method includes steps described below.

A first communication node transmits signaling to a second communication node, where the signaling is used for indicating a resource or a frequency hopping manner used by the second communication node for transmitting the uplink signal.

Alternatively, the first communication node predefines the resource or the frequency hopping manner used by the second communication node for transmitting the uplink signal.

Another embodiment of the present application provides a method for determining an uplink signal. The method includes steps described below.

A second communication node receives signaling transmitted by a first communication node, where the signaling is used for indicating a resource or a frequency hopping manner used by the second communication node for transmitting the uplink signal. Alternatively, the second communication node predefines the resource or the frequency hopping manner used by the second communication node for transmitting the uplink signal. The second communication node transmits the uplink signal by using the resource or the frequency hopping manner for transmitting the uplink signal.

Another embodiment of the present application provides an apparatus for configuring an uplink signal, which is applied to a first communication node. The apparatus includes a configuration module.

The configuration module is configured to transmit signaling to a second communication node, where the signaling is used for indicating a resource or a frequency hopping manner used by the second communication node for transmitting the uplink signal. The configuration module is further configured to predefine the resource or the frequency hopping manner used by the second communication node for transmitting the uplink signal with the second communication node.

Another embodiment of the present application provides an apparatus for determining an uplink signal, which is applied to a second communication node. The apparatus includes a determining module and a transmission module. The determining module is configured to receive signaling transmitted by a first communication node, where the signaling is used for indicating a resource or a frequency hopping manner used by the second communication node for transmitting the uplink signal. The determining module is further configured to predefine the resource or the frequency hopping manner used by the second communication node for transmitting the uplink signal with the first communication node. The transmission module is configured to transmit the uplink signal by using the resource or the frequency hopping manner for transmitting the uplink signal.

Another embodiment of the present application provides a base station. The base station includes a first processor. The first processor is configured to transmit signaling to a second communication node, where the signaling is used for indicating a resource or a frequency hopping manner used by the second communication node for transmitting an uplink signal. The first processor is configured to predefine the resource or the frequency hopping manner used by the second communication node for transmitting the uplink signal with the second communication node.

Another embodiment of the present application provides a terminal. The terminal includes a second processor. The second processor is configured to receive signaling transmitted by a first communication node, where the signaling is used for indicating a resource or a frequency hopping manner used by the second processor for transmitting an uplink signal. Alternatively, the second processor is configured to predefine the resource or the frequency hopping manner used by the second processor for transmitting the uplink signal with the first communication node. The second processor is further configured to transmit the uplink signal by using the resource or the frequency hopping manner for transmitting the uplink signal.

Another embodiment of the present application provides a storage medium. The storage medium includes stored programs, where when executed, the programs are configured for executing the method according to the optional embodiments described above.

Another embodiment of the present application provides a processor. The processor is configured to execute programs, where when executed, the programs are configured for executing the method according to the optional embodiments described above.

In the technical solution of the present disclosure, the second communication node transmits the uplink signal by using the determined resource or frequency hopping manner, solving the problem of how to transmit the uplink signal in the new system.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail with reference to the drawings and in conjunction with embodiments. In an embodiment, the terms “first”, “second” and the like in the description, claims and above drawings of the present application are used to distinguish between similar objects and are not necessarily used to describe a particular order or sequence.

Embodiments of the present application provide a mobile communication network (which includes, but is not limited to, a 5G mobile communication network). A network architecture of the network may include a network side device (such as a base station) and a terminal. An information transmission method executable on the preceding network architecture is provided in this embodiment. An execution environment of the information transmission method provided by the embodiments of the present application is not limited to the preceding network architecture. A new system in the present application includes the 5G mobile communication network.

In the present application, a first communication node refers to a node configured to determine a transmission mode of a second communication node and indicate the transmission mode through signaling to the second communication node, and the second communication node refers to a node configured to receive the signaling. In an implementation manner, the first communication node may be a base station of a macro cell, a base station or a transmission node of a small cell, a transmission node in a high frequency communication system, a transmission node in an Internet of Things (IoT) system, or the like. The second communication node may be a node in a communication system, such as a user equipment (UE), a mobile phone, a portable device, or a car, In another implementation manner, the base station of the macro cell, the base station or the transmission node of the small cell, the transmission node in a high-frequency communication system, the transmission node in the Internet of Things system, or the like may serve as the second communication node, and the UE or the like may serve as the first communication node.

Embodiment 1

Figure 1:
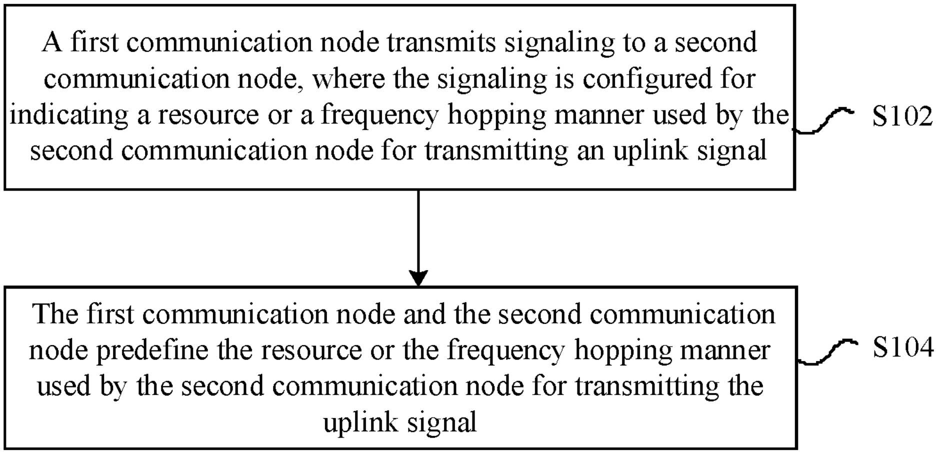
FIG. 1 is a flowchart of a method for configuring an uplink signal according to an embodiment of the present application.

The present embodiment provides a method for configuring an uplink signal executed on the network architecture described above. FIG. 1 is a flowchart of a method for configuring an uplink signal according to an embodiment of the present application. As shown in FIG. 1, the method includes a step described below.

In step S102, a first communication node transmits signaling to a second communication node, where the signaling is used for indicating a resource or a frequency hopping manner used by the second communication node for transmitting the uplink signal.

Alternatively, in step S104, the first communication node and the second communication node predefine the resource or the frequency hopping manner used by the second communication node for transmitting the uplink signal.

Through the above steps, the first communication node indicates, through the signaling, the resource or the frequency hopping manner used by the second communication node for transmitting the uplink signal, or the first communication node and the second communication node predefine the resource or the frequency hopping manner used by the second communication node for transmitting the uplink signal. With the above technical solution, the second communication node transmits the uplink signal by using the resource or the frequency hopping manner, solving the problem of how to transmit the uplink signal in a new system.

In an embodiment, the above steps may, but may not necessarily, be executed by a base station.

In an embodiment, the resource for transmitting the uplink signal includes at least one of: a time domain resource, a frequency domain resource, or a code domain resource, where the time domain resource includes at least one of: a time domain symbol resource, a timeslot resource, or a sub-frame resource.

In an embodiment, the uplink signal includes at least one of: a sounding reference signal, an uplink demodulation reference signal, an uplink phase tracking reference signal, or uplink data, where the uplink data includes at least one of: data of a physical uplink shared channel or data of a physical uplink control channel.

In an embodiment, the frequency hopping manner for transmitting the uplink signal includes at least one of: using a same transmission mode and occupying different frequency domain resources on a group of time domain resources; occupying a same frequency domain resource and using different transmission modes on the group of time domain resources; intra-slot frequency hopping or symbol-based hopping; or inter-timeslot hopping or timeslot-based hopping.

In an embodiment, a transmission mode for transmitting the uplink signal includes at least one of: a transmit beam, a transmit antenna, a transmit sector, precoding at a transmitting end, indicating through an antenna port, indicating through an antenna weight vector, indicating through an antenna weight matrix, a space division multiplexing manner, a frequency domain/time domain transmission diversity manner, a transmission sequence, a number of transmission layers, a transmission mode, a modulation and coding scheme, indicating through a reference signal, indicating through a reference signal index, a spatial domain transmission filter, or a spatial quasi-co-location. In an embodiment, the indication through the antenna port, the indication through the antenna weight vector, the indication through the antenna weight matrix, the space division multiplexing manner, the frequency domain/time domain transmission diversity manner, the transmission sequence, the number of transmission layers, the transmission mode, the modulation and coding scheme, the indication through the reference signal, the indication through the reference signal index, the spatial domain transmission filter, and the spatial quasi-co-location described in the present embodiment mean that the transmission mode for transmitting the uplink signal may be indicated by a beam position, an antenna position, or the like corresponding to the content described above. For example, the indication through the reference signal index means that the second communication node transmits the uplink signal for different beams by transmitting different reference signals.

In an embodiment, the signaling includes at least one of: radio resource control (RRC) signaling, medium access control element (MAC CE) signaling, or physical downlink control signaling.

In an embodiment, the signaling carries at least one of: first information, second information, third information, fourth information, fifth information, or sixth information. The first information is configured for indicating a plurality of starting physical resource block allocation positions or time-frequency positions for transmitting the uplink signal. The second information is configured for indicating to the second communication node a time-frequency position of an idle resource or a time-frequency resource mapping region reserved for the uplink data. The third information is configured for instructing the second communication node to transmit the uplink data at a same position as a time-frequency resource position at which another second communication node transmits the sounding reference signal. The fourth information is configured for instructing the second communication node to transmit the uplink data at the time-frequency position of the idle resource or transmit the uplink data in the time-frequency resource mapping region reserved for the uplink data. The fifth information is configured for instructing the second communication node to transmit the sounding reference signal. The sixth information is configured for indicating whether the second communication node transmits the uplink data on a time domain symbol where the sounding reference signal is located. A position of the time domain symbol where the sounding reference signal is located or a number of time domain symbols where the sounding reference signal is located may be configured by the first communication node through cell-specific signaling or user-specific signaling, or predefined by the first communication node and the second communication node.

In an embodiment, the first information includes at least one of: an indication of a starting physical resource block allocation position or a time-frequency position used by the second communication node for transmitting the uplink signal; or an indication of a starting physical resource block allocation position or a time-frequency position used by the another second communication node for transmitting the uplink signal.

In an embodiment, the step in which the first communication node transmits the signaling to the second communication node, where the signaling is used for indicating the resource or the frequency hopping manner used by the second communication node for transmitting the uplink signal, includes steps described below. The first communication node transmits first signaling to the second communication node, where the first signaling is used for indicating the starting physical resource block allocation position or the time-frequency position used by the another second communication node for transmitting the sounding reference signal. The first communication node transmits second signaling to the second communication node, where the second signaling is used for instructing the second communication node to transmit the uplink data at a same position as a time-frequency resource position at which another second communication node transmits the sounding reference signal, where the time-frequency resource position includes at least one of: the starting physical resource block allocation position or the time-frequency position.

In an embodiment, the step in which the first communication node transmits the signaling to the second communication node, where the signaling is used for indicating the resource or the frequency hopping manner used by the second communication node for transmitting the uplink signal, includes steps described below. The first communication node transmits third signaling to the second communication node, where the third signaling is used for indicating to the second communication node the time-frequency position of the idle resource or the time-frequency resource mapping region reserved for the uplink data. The first communication node transmits fourth signaling to the second communication node, where the fourth signaling is used for instructing the second communication node to transmit the uplink data at the time-frequency position of the idle resource or transmit the uplink data in the time-frequency resource mapping region reserved for the uplink data. The time-frequency resource position at which another second communication node transmits the sounding reference signal includes the starting physical resource block allocation position and/or a corresponding position in a frequency hopping pattern of a subsequent time domain symbol at which another second communication node transmits the sounding reference signal. In an embodiment, the subsequent time domain symbol here may refer to symbol 2, symbol 3, and symbol 4 in FIG. 5.

In an embodiment, the step in which the first communication node transmits the signaling to the second communication node, where the signaling is used for indicating the resource or the frequency hopping manner used by the second communication node for transmitting the uplink signal, includes steps described below. When the first communication node transmits fifth signaling and sixth signaling to the second communication node, the second communication node is allowed to transmit the uplink data at a time-frequency resource position of the sounding reference signal, where the fifth signaling is used for indicating to the second communication node a starting physical resource block allocation position or a time-frequency position for transmitting the sounding reference signal, and the sixth signaling is used for instructing the second communication node not to trigger the sounding reference signal, where the time-frequency resource position includes at least one of: the starting physical resource block allocation position or the time-frequency position.

In an embodiment, the first signaling, the second signaling, the third signaling, the fourth signaling, the fifth signaling, and the sixth signaling each include at least one of: radio resource control (RRC) signaling, medium access control element (MAC CE) signaling, or physical downlink control signaling.

In an embodiment, the first communication node performs at least one of: a signaling interaction of the resource used by the uplink signal or a signaling interaction of the frequency hopping manner used by the uplink signal with a first communication node of another neighboring cell.

Figure 2:
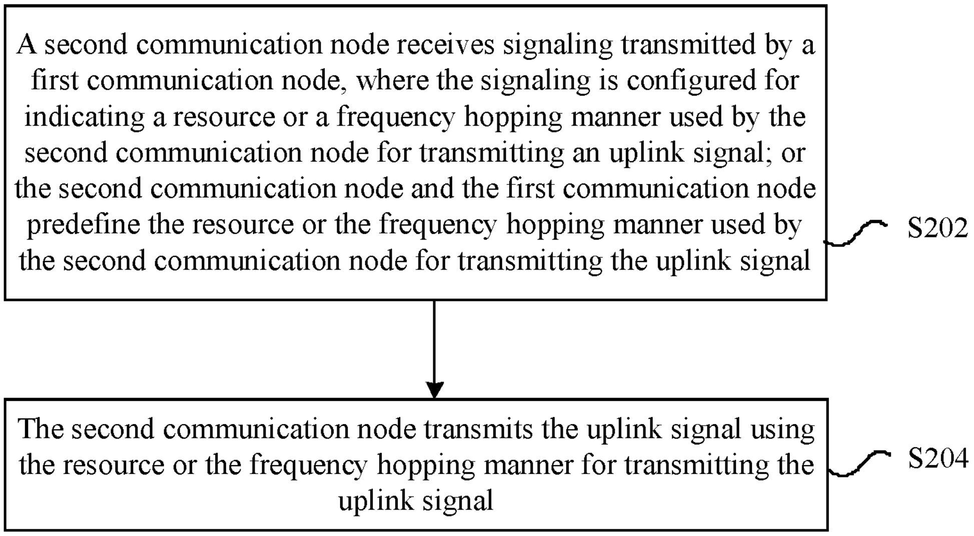
FIG. 2 is a flowchart of a method for determining an uplink signal according to an embodiment of the present application.

The present embodiment provides a method for determining an uplink signal executed on the network architecture described above. FIG. 2 is a flowchart of a method for determining an uplink signal according to an embodiment of the present application. As shown in FIG. 2, the method includes steps described below.

In step S202, a second communication node receives signaling transmitted by a first communication node, where the signaling is used for indicating a resource or a frequency hopping manner used by the second communication node for transmitting the uplink signal; or the second communication node and the first communication node predefine the resource or the frequency hopping manner used by the second communication node for transmitting the uplink signal; and In step S204, the second communication node transmits the uplink signal by using the resource or the frequency hopping manner for transmitting the uplink signal.

In an embodiment, the above steps may, but may not necessarily, be executed by a terminal.

In an embodiment, the resource used by the second communication node for transmitting the uplink signal includes at least one of: a time domain resource, a frequency domain resource, or a code domain resource, where the time domain resource includes a least one of: a time domain symbol resource, a timeslot resource, or a sub-frame resource.

In an embodiment, the uplink signal includes at least one of: a sounding reference signal, an uplink demodulation reference signal, an uplink phase tracking reference signal, or uplink data, where the uplink data includes at least one of: data of a physical uplink shared channel or data of a physical uplink control channel.

In an embodiment, the frequency hopping manner for transmitting the uplink signal includes at least one of: using a same transmission mode and occupying different frequency domain resources on a group of time domain resources; occupying a same frequency domain resource and using different transmission modes on the group of time domain resources; intra-slot frequency hopping or symbol-based hopping; or inter-timeslot hopping or timeslot-based hopping.

In an embodiment, a transmission mode for transmitting the uplink signal includes at least one of: a transmit beam, a transmit antenna, a transmit sector, precoding at a transmitting end, indicating through an antenna port, indicating through an antenna weight vector, indicating through an antenna weight matrix, a space division multiplexing manner, a frequency domain/time domain transmission diversity manner, a transmission sequence, a number of transmission layers, a transmission mode, a modulation and coding scheme, indicating through a reference signal, indicating through a reference signal index, a spatial domain transmission filter, or a spatial quasi-co-location.

In an embodiment, the step in which the second communication node receives the signaling transmitted by the first communication node, where the signaling is used for indicating the resource or the frequency hopping manner used by the second communication node for transmitting the uplink signal includes steps described below. The second communication node receives first signaling, where the first signaling is used for indicating to the second communication node a starting physical resource block allocation position or a time-frequency position used by another second communication node for transmitting the sounding reference signal. The second communication node receives second signaling, where the second signaling is used for instructing the second communication node to transmit the uplink data at a same position as a time-frequency resource position at which another second communication node transmits the sounding reference signal, and the time-frequency resource position includes at least one of: the starting physical resource block allocation position or the time-frequency position.

In an embodiment, the step in which the second communication node receives the signaling transmitted by the first communication node, where the signaling is used for indicating the resource or the frequency hopping manner used by the second communication node for transmitting the uplink signal includes steps described below. The second communication node receives third signaling, where the third signaling is used for indicating to the second communication node a time-frequency position of an idle resource or a time-frequency resource mapping region reserved for the uplink data. The second communication node receives fourth signaling, where the fourth signaling is used for instructing the second communication node to transmit the uplink data at the time-frequency position of the idle resource or transmit the uplink data in the time-frequency resource mapping region reserved for the uplink data.

In an embodiment, the step in which the second communication node receives the signaling transmitted by the first communication node, where the signaling is used for indicating the resource or the frequency hopping manner used by the second communication node for transmitting the uplink signal, includes steps described below. When the second communication node receives fifth signaling and sixth signaling, the second communication node is allowed to transmit the uplink data at a time-frequency resource position of the sounding reference signal, where the fifth signaling is used for indicating to the second communication node a starting physical resource block allocation position or a time-frequency position for transmitting the sounding reference signal, and the sixth signaling is used for instructing the second communication node not to trigger the sounding reference signal, where the time-frequency resource position includes at least one of: the starting physical resource block allocation position or the time-frequency position.

In an embodiment, the first signaling, the second signaling, the third signaling, the fourth signaling, the fifth signaling, and the sixth signaling each include at least one of: radio resource control (RRC) signaling, medium access control element (MAC CE) signaling, or physical downlink control signaling.

Example 1

A first communication node indicates, through signaling, a resource or a frequency hopping manner used by a second communication node for transmitting an uplink signal, or the second communication node predefines the resource or the frequency hopping manner used by the second communication node for transmitting the uplink signal, where the uplink signal includes at least one of: a sounding reference signal, a physical uplink shared channel, or uplink data. The resource includes at least one of: a time domain resource, a frequency domain resource, or a code domain resource, where the time domain resource includes at least one of: a time domain symbol resource, a timeslot resource, or a sub-frame resource.

The frequency hopping manner includes at least one of manners described below.

Figure 3:
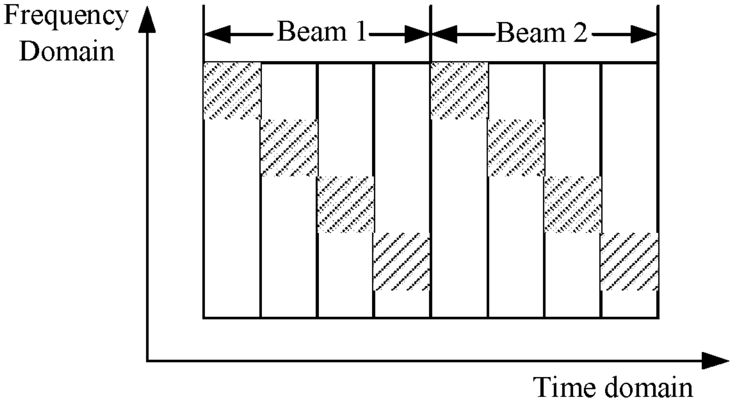
FIG. 3 is a schematic diagram of a frequency hopping manner in example 1 of the present application.

(1) A same transmission beam is used and different frequency domain resources are occupied on a group of time domain resources, as shown in FIG. 3. FIG. 3 is a schematic diagram of a frequency hopping manner in example 1 of the present application.

Figure 4:
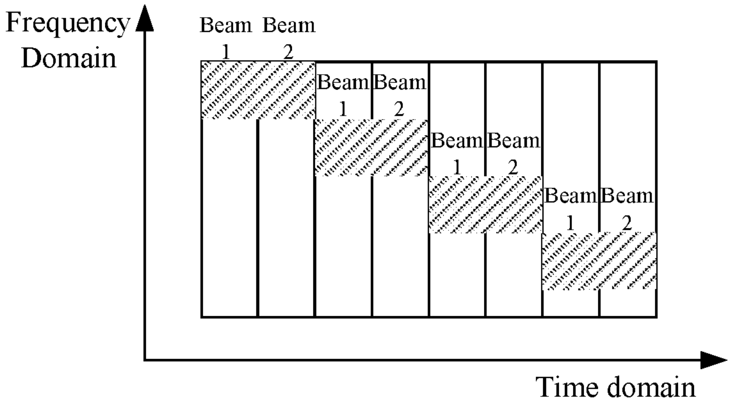
FIG. 4 is a schematic diagram of another frequency hopping manner in example 1 of the present application.

(2) A same frequency domain resource is occupied and different transmit beams are used on the group of time domain resources, as shown in FIG. 4. FIG. 4 is a schematic diagram of another frequency hopping manner in example 1 of the present application.

Example 2

Figure 5:
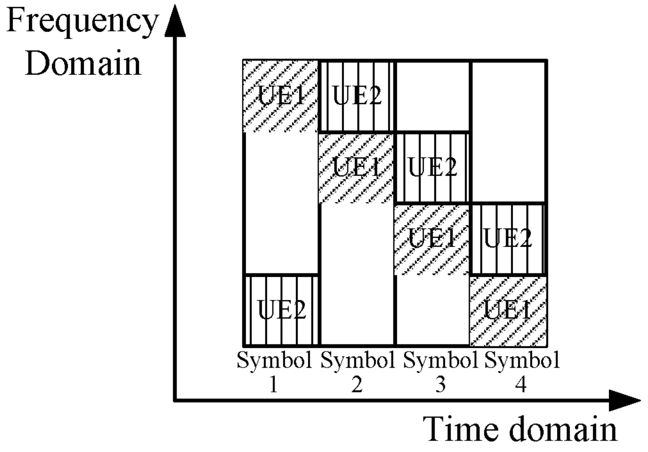
FIG. 5 is a schematic diagram of time-frequency positions in example 2 of the present application.

A first communication node indicates a starting physical resource block allocation position at which another second communication node transmits a sounding reference signal to a second communication node through RRC signaling and the first communication node instructs the second communication node to transmit uplink data at a same position as a time-frequency resource position at which another second communication node transmits the sounding reference signal. The time-frequency resource position at which another second communication node transmits the sounding reference signal includes the starting physical resource block allocation position of a first time domain symbol and/or a corresponding time-frequency position in a frequency hopping pattern of a subsequent time domain symbol at which another second communication node transmits the sounding reference signal. As shown in FIG. 5, FIG. 5 is a schematic diagram of time-frequency positions in example 2 of the present application. A number of time domain symbols and/or a time domain position for transmitting the sounding reference signal in a sub-frame or a timeslot are indicated by the first communication node through signaling or predefined by the first communication node and the second communication node. A UE1 is a target UE of a cell, a UE2 is another UE in the cell, and a base station of the cell indicates a starting physical resource block allocation position at which the UE1 transmits the sounding reference signal through the RRC signaling, that is, a frequency domain position occupied by the UE1 of a symbol 1 in FIG. 5. The base station indicates a starting physical resource block allocation position at which the UE2 transmits the sounding reference signal to the UE1 through the RRC signaling, that is, a frequency domain position occupied by the UE2 of the symbol 1 in FIG. 5. A frequency domain position on another symbol is a frequency hopping position. When the base station triggers the UE1 to transmit the SRS through the downlink control signaling, if the UE2 has no SRS to be transmitted, an SRS time-frequency resource reserved for the UE2 may be used by the UE1 for transmitting the uplink data, thereby improving a utilization rate of time-frequency resources and increasing an uplink throughput of the UE 1.

Example 3

A first communication node indicates a time-frequency position of an idle resource or a potential uplink data mapping region to a second communication node through RRC signaling. Alternatively, the first communication node indicates a starting physical resource block allocation position used by the second communication node for transmitting sounding reference signal and a starting physical resource block allocation position at which another second communication node transmits the sounding reference signal through the RRC signaling, such as starting physical resource block allocation positions occupied by a UE1 and a UE2 of a symbol 1 in FIG. 5. After receiving the RRC signaling, the UE1 may calculate the time-frequency position of the idle resource on symbols 1 to 4 or the potential uplink data mapping region, such as blank regions on the symbols 1 to 4 in FIG. 5. The first communication node instructs the UE1 to transmit uplink data at the time-frequency position of the idle resource or in a time-frequency resource mapping region reserved for the uplink data through physical downlink control signaling, thereby improving a utilization rate of time-frequency resources on the premise of not affecting an SRS transmission of another UE (for example, the UE2).

Example 4

When a first communication node indicates a starting physical resource block allocation position at which a second communication node transmits a sounding reference signal through RRC signaling, and the first communication node instructs the second communication node not to trigger the sounding reference signal through physical downlink control signaling, the second communication node may transmit uplink data at a time-frequency resource position of the sounding reference signal. The time-frequency resource position of the sounding reference signal includes the starting physical resource block allocation position used by the second communication node for transmitting the sounding reference signal and/or a corresponding time-frequency position in a frequency hopping pattern of a subsequent time-domain symbol. Table 1 is a value table of an SRS request domain according to example 4. As shown in Table 1, if a value of the SRS request domain in the downlink control signaling is 00, it indicates that a UE1 has no need to transmit the SRS. If the UE1 has a PUSCH to be transmitted, data may be mapped to a time-frequency resource reserved for the SRS of the UE1, such as a resource occupied by the UE1 on symbols 1 to 4 in FIG. 5, and then the PUSCH is transmitted.

TABLE 1

| Value of SRS Request Domain | Description |
|---|---|
| 00 | Not triggering the SRS |
| 01 | Triggering the SRS and using an SRS parameter set |
| 10 | Triggering the SRS and using an SRS parameter set 2 |
| 11 | Triggering the SRS and using an SRS parameter set 3 |

Example 5

A first communication node interacts a resource and/or a frequency hopping manner used by an uplink signal with a first communication node of a neighboring cell through X2 interface signaling, for example, interacts an index of a timeslot, sub-frame, or symbol for transmitting an SRS, interacts a time-frequency position occupied by the SRS such as time-frequency positions occupied by a UE1 and a UE2 in FIG. 5, and interacts a time-frequency resource position of an idle region such as-time-frequency positions of blank regions in FIG. 5.

Embodiment 2

Another embodiment of the present application provides an apparatus for configuring an uplink signal, which is applied to a first communication node. The apparatus includes a configuration module.

The configuration module is configured to transmit signaling to a second communication node, where the signaling is used for indicating a resource or a frequency hopping manner used by the second communication node for transmitting the uplink signal. Alternatively, the configuration module is further configured to predefine the resource or the frequency hopping manner used by the second communication node for transmitting the uplink signal.

In an embodiment, the configuration module is configured to transmit first signaling to the second communication node, where the first signaling is used for indicating to the second communication node a starting physical resource block allocation position or a time-frequency position at which another second communication node transmits a sounding reference signal. The configuration module is further configured to transmit second signaling to the second communication node, where the second signaling is used for instructing the second communication node to transmit uplink data at a same position as a time-frequency resource position at which another second communication node transmits the sounding reference signal, where the time-frequency resource position includes at least one of: the starting physical resource block allocation position or the time-frequency position.

In an embodiment, the configuration module is configured to transmit third signaling to the second communication node, where the third signaling is used for indicating to the second communication node a time-frequency position of an idle resource or a time-frequency resource mapping region reserved for the uplink data. The configuration module is further configured to transmit fourth signaling to the second communication node, where the fourth signaling is used for instructing the second communication node to transmit the uplink data at the time-frequency position of the idle resource or transmit the uplink data in the time-frequency resource mapping region reserved for the uplink data.

In an embodiment, the configuration module is configured to, when transmitting fifth signaling and sixth signaling to the second communication node, allow the second communication node to transmit the uplink data at a time-frequency resource position of the sounding reference signal, where the fifth signaling is used for indicating to the second communication node a starting physical resource block allocation position or a time-frequency position for transmitting the sounding reference signal, and the sixth signaling is used for instructing the second communication node not to trigger the sounding reference signal, where the time-frequency resource position includes at least one of: the starting physical resource block allocation position or the time-frequency position.

In an embodiment, the first signaling, the second signaling, the third signaling, the fourth signaling, the fifth signaling, and the sixth signaling each includes at least one of: radio resource control (RRC) signaling, medium access control control element (MAC CE) signaling, or physical downlink control signaling.

In an embodiment, the configuration module is further configured to perform at least one of: a signaling interaction of the resource used by the uplink signal or a signaling interaction of the frequency hopping manner used by the uplink signal with a neighboring cell.

Another embodiment of the present application provides an apparatus for determining an uplink signal, which is applied to a second communication node. The apparatus includes a determining module and a transmission module. The determining module is configured to determine a resource or a frequency hopping manner for transmitting an uplink signal in one of manners described below. The determining module is configured to receive signaling transmitted by a first communication node, where the signaling is used for indicating the resource or the frequency hopping manner used by the second communication node for transmitting the uplink signal. The determining module is further configured to predefine the resource or the frequency hopping manner used by the second communication node for transmitting the uplink signal. The transmission module is configured to transmit the uplink signal by using the resource or the frequency hopping manner for transmitting the uplink signal.

In an embodiment, the determining module is configured to receive first signaling, where the first signaling is used for indicating to the second communication node a starting physical resource block allocation position or a time-frequency position at which another second communication node transmits a sounding reference signal. The determining module is further configured to receive second signaling, where the second signaling is used for instructing the second communication node to transmit uplink data at a same position as a time-frequency resource position used by the another second communication node for transmitting the sounding reference signal, where the time-frequency resource position includes at least one of: the starting physical resource block allocation position or the time-frequency position.

In an embodiment, the determining module is configured to receive third signaling, where the third signaling is used for indicating to the second communication node a time-frequency position of an idle resource or a time-frequency resource mapping region reserved for the uplink data. The determining module is further configured to receive fourth signaling, where the fourth signaling is used for instructing the second communication node to transmit the uplink data at the time-frequency position of the idle resource or transmit the uplink data in the time-frequency resource mapping region reserved for the uplink data.

In an embodiment, the determining module is configured to: when receiving fifth signaling and sixth signaling, allow the second communication node to transmit the uplink data at a time-frequency resource position of the sounding reference signal, where the fifth signaling is used for indicating to the second communication node a starting physical resource block allocation position or a time-frequency position for transmitting the sounding reference signal, and the sixth signaling is used for instructing the second communication node not to trigger the sounding reference signal, where the time-frequency resource position includes at least one of: the starting physical resource block allocation position or the time-frequency position.

In an embodiment, the first signaling, the second signaling, the third signaling, the fourth signaling, the fifth signaling, and the sixth signaling each includes at least one of: radio resource control (RRC) signaling, medium access control control element (MAC CE) signaling, or physical downlink control signaling.

Embodiment 3

A base station is provided by another embodiment of the present application. The base station includes a first processor. The first processor is configured to transmit signaling to a second communication node, where the signaling is used for indicating a resource or a frequency hopping manner used by the second communication node for transmitting an uplink signal. Alternatively, the first processor is configured to predefine the resource or the frequency hopping manner used by the second communication node for transmitting the uplink signal.

A terminal is provided by another embodiment of the present application. The terminal includes a second processor. The second processor is configured to determine a resource or a frequency hopping manner for transmitting an uplink signal in one of manners described below. The second processor receives signaling transmitted by a first communication node, where the signaling is used for indicating the resource or the frequency hopping manner used by a second communication node for transmitting the uplink signal. Alternatively, the second processor predefines the resource or the frequency hopping manner used by the second processor for transmitting the uplink signal. The second processor transmits the uplink signal by using the resource or the frequency hopping manner for transmitting the uplink signal.

Embodiment 4

A storage medium is provided by another embodiment of the present application. The storage medium includes stored programs, where when executed, the programs are configured for executing the methods according to the embodiments described above.

Embodiment 5

A processor is provided by another embodiment of the present application. The processor is configured to execute programs, where when executed, the programs are configured for executing the methods according to the embodiments described above.

From the description of the embodiments described above, it will be apparent to those skilled in the art that the methods in the embodiments described above may be implemented by software plus a general-purpose hardware platform, or may of course be implemented by hardware. However, in many cases, the former is a preferred implementation mode. Based on such an understanding, the solutions provided by the present application may be embodied in the form of a software product. The computer software product is stored in a storage medium (such as a read-only memory (ROM), a random-access memory (RAM), a magnetic disk or an optical disk) and includes several instructions for enabling a second communication node device (which may be a mobile phone, a computer, a server, or a network device) to execute the method described in each embodiment of the present application.

In the present embodiment, the storage medium may include, but is not limited to, a USB flash disk, a ROM, a RAM, a mobile hard disk, a magnetic disk, an optical disk or another medium capable of storing program codes.

In the present embodiment, the processor executes, according to the program codes stored in the storage medium, the methods described in the above-mentioned embodiments.

For examples in the present embodiment, reference may be made to the examples described in the above-mentioned embodiments and optional implementation manners, and repetition will not be made in the present embodiment.

Apparently, it should be understood by those skilled in the art that each of the above-mentioned modules or steps of the present application may be implemented by a general-purpose computing apparatus, and the modules or steps may be concentrated on a single computing apparatus or distributed on a network composed of multiple computing apparatuses. The modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. A method for configuring an uplink signal, comprising:

transmitting, by a first communication node, signaling to a second communication node, wherein the signaling is used for indicating a resource or a frequency hopping manner used by the second communication node for transmitting the uplink signal; or predefining, by the first communication node and the second communication node, the resource or the frequency hopping manner used by the second communication node for transmitting the uplink signal;

wherein the signaling carries first information for instructing the second communication node to transmit the uplink data at a same position as a time-frequency resource position at which another second communication node transmits the sounding reference signal;

wherein the frequency hopping manner for transmitting the uplink signal comprises occupying a same frequency domain resource and using different transmission modes on the group of time domain resources;

wherein the transmitting, by the first communication node, the signaling to the second communication node, wherein the signaling is used for indicating the resource or the frequency hopping manner used by the second communication node for transmitting the uplink signal, comprising:

transmitting, by the first communication node, first signaling to the second communication node, wherein the first signaling is used for indicating to the second communication node a starting physical resource block allocation position or a time-frequency position at which another second communication node transmits the sounding reference signal; and transmitting, by the first communication node, second signaling to the second communication node, wherein the second signaling is used for instructing the second communication node to transmit the uplink data at a same position as a time-frequency resource position used by the another second communication node for transmitting the sounding reference signal, wherein the time-frequency resource position comprises at least one of: the starting physical resource block allocation position or the time-frequency position;

wherein the time-frequency position at which another second communication node transmits the sounding reference signal comprises at least one of: a starting physical resource block allocation position of a first time domain symbol and a corresponding time-frequency position in a frequency hopping pattern of a subsequent time domain symbol at which another second communication node transmits the sounding reference signal.

2. The method of claim 1, wherein the transmitting, by the first communication node, the signaling to the second communication node, wherein the signaling is used for indicating the resource or the frequency hopping manner used by the second communication node for transmitting the uplink signal, comprising:

transmitting, by the first communication node, third signaling to the second communication node, wherein the third signaling is used for indicating to the second communication node a time-frequency position of an idle resource or a time-frequency resource mapping region reserved for the uplink data; and transmitting, the first communication node, fourth signaling to the second communication node, wherein the fourth signaling is used for instructing the second communication node to transmit the uplink data at the time-frequency position of the idle resource or transmit the uplink data in the time-frequency resource mapping region reserved for the uplink data.

3. The method of claim 1, wherein the transmitting, by the first communication node, the signaling to the second communication node, wherein the signaling is used for indicating the resource or the frequency hopping manner used by the second communication node for transmitting the uplink signal, comprising:

when the first communication node transmits fifth signaling and sixth signaling to the second communication node, allowing the second communication node to transmit the uplink data at a time-frequency resource position of the sounding reference signal, wherein the fifth signaling is used for indicating to the second communication node a starting physical resource block allocation position or a time-frequency position for transmitting the sounding reference signal, and the sixth signaling is used for instructing the second communication node not to trigger the sounding reference signal, wherein the time-frequency resource position comprises at least one of: the starting physical resource block allocation position or the time-frequency position.

4. An apparatus for configuring an uplink signal, which is applied to a first communication node, comprising:

a configuration module, which is configured to transmit signaling to a second communication node, wherein the signaling is used for indicating a resource or a frequency hopping manner used by the second communication node for transmitting the uplink signal;

wherein the configuration module is further configured to predefine the resource or the frequency hopping manner used by the second communication node for transmitting the uplink signal with the second communication node at least one processor; and a memory communicably connected with the at least one processor and configured for storing computer-executable instructions executable by the at least one processor;

wherein the computer-executable instructions when executed by the at least one processor causes the at least one processor to perform the method of claim 1.

5. A method for determining an uplink signal, comprising:

receiving, by a second communication node, signaling transmitted by a first communication node, wherein the signaling is used for indicating a resource or a frequency hopping manner used by the second communication node for transmitting the uplink signal; or predefining, by the second communication node and the second communication node, the resource or the frequency hopping manner used by the second communication node for transmitting the uplink signal; and transmitting, by the second communication node, the uplink signal by using the resource or the frequency hopping manner for transmitting the uplink signal;

wherein the signaling carries first information for instructing the second communication node to transmit the uplink data at a same position as a time-frequency resource position at which another second communication node transmits the sounding reference signal;

wherein the frequency hopping manner used by the second communication node for transmitting the uplink signal comprises occupying a same frequency domain resource and using different transmission modes on the group of time domain resources;

wherein the receiving, by the second communication node, the signaling transmitted by the first communication node, wherein the signaling is used for indicating the resource or the frequency hopping manner used by the second communication node for transmitting the uplink signal, comprising:

receiving, by the second communication node, first signaling, wherein the first signaling is used for indicating to the second communication node a starting physical resource block allocation position or a time-frequency position at which another second communication node transmits the sounding reference signal; and receiving, by the second communication node, second signaling, wherein the second signaling is used for instructing the second communication node to transmit the uplink data at a same position as a time-frequency resource position used by the another second communication node for transmitting the sounding reference signal, wherein the time-frequency resource position comprises at least one of: the starting physical resource block allocation position or the time-frequency position;

wherein the time-frequency position at which another second communication node transmits the sounding reference signal comprises at least one of: a starting physical resource block allocation position of a first time domain symbol and a corresponding time-frequency position in a frequency hopping pattern of a subsequent time domain symbol at which another second communication node transmits the sounding reference signal.

6. The method of claim 5, wherein the receiving, by the second communication node, the signaling transmitted by the first communication node, wherein the signaling is used for indicating the resource or the frequency hopping manner used by the second communication node for transmitting the uplink signal, comprising:

receiving, by the second communication node, third signaling, wherein the third signaling is used for indicating to the second communication node a time-frequency position of an idle resource or a time-frequency resource mapping region reserved for the uplink data;

receiving, the second communication node, fourth signaling, wherein the fourth signaling is used for instructing the second communication node to transmit the uplink data at the time-frequency position of the idle resource or transmit the uplink data in the time-frequency resource mapping region reserved for the uplink data.

7. The method of claim 5, wherein the receiving, by the second communication node, the signaling transmitted by the first communication node, wherein the signaling is used for indicating the resource or the frequency hopping manner used by the second communication node for transmitting the uplink signal, comprising:

when the second communication node receives fifth signaling and sixth signaling, the second communication node being allowed to transmit the uplink data at a time-frequency resource position of the sounding reference signal, wherein the fifth signaling is used for indicating to the second communication node a starting physical resource block allocation position or a time-frequency position for transmitting the sounding reference signal, and the sixth signaling is used for instructing the second communication node not to trigger the sounding reference signal, wherein the time-frequency resource position comprises at least one of: the starting physical resource block allocation position or the time-frequency position.

8. The method of claim 5, wherein the signaling, the first signaling, the second signaling, the third signaling, the fourth signaling, the fifth signaling, and the sixth signaling each comprise at least one of: radio resource control (RRC) signaling, medium access control element (MAC CE) signaling, or physical downlink control signaling.

9. An apparatus for determining an uplink signal, which is applied to a second communication node, comprising a processor and a storage; wherein the storage stores a processor-executable program executed by the processor, and the program comprises:

a determining module, which is configured to receive signaling transmitted by a first communication node, wherein the signaling is used for indicating a resource or a frequency hopping manner used by the second communication node for transmitting the uplink signal;

wherein the determining module is further configured to predefine the resource or the frequency hopping manner used by the second communication node for transmitting the uplink signal with the first communication node; and a transmission module, which is configured to transmit the uplink signal by using the resource or the frequency hopping manner for transmitting the uplink signal;

wherein the signaling carries first information for instructing the second communication node to transmit the uplink data at a same position as a time-frequency resource position at which another second communication node transmits the sounding reference signal;

wherein the frequency hopping manner for transmitting the uplink signal comprises occupying a same frequency domain resource and using different transmission modes on the group of time domain resources;

wherein the determining module is configured to receive first signaling, wherein the first signaling is used for indicating to the second communication node a starting physical resource block allocation position or a time-frequency position at which another second communication node transmits a sounding reference signal; and wherein the determining module is further configured to receive second signaling, wherein the second signaling is used for instructing the second communication node to transmit uplink data at a same position as a time-frequency resource position used by the another second communication node for transmitting the sounding reference signal, wherein the time-frequency resource position comprises at least one of: the starting physical resource block allocation position or the time-frequency position;

wherein the time-frequency position at which another second communication node transmits the sounding reference signal comprises at least one of: a starting physical resource block allocation position of a first time domain symbol and a corresponding time-frequency position in a frequency hopping pattern of a subsequent time domain symbol at which another second communication node transmits the sounding reference signal.

10. The apparatus of claim 9, wherein the determining module is configured to receive third signaling, wherein the third signaling is used for indicating to the second communication node a time-frequency position of an idle resource or a time-frequency resource mapping region reserved for uplink data; and wherein the determining module is further configured to receive fourth signaling, wherein the fourth signaling is used for instructing the second communication node to transmit the uplink data at the time-frequency position of the idle resource or transmit the uplink data in the time-frequency resource mapping region reserved for the uplink data.

11. The apparatus of claim 9, wherein the determining module is configured to:

when receiving fifth signaling and sixth signaling, allow the second communication node to transmit uplink data at a time-frequency resource position of a sounding reference signal, wherein the fifth signaling is used for indicating to the second communication node a starting physical resource block allocation position or a time-frequency position for transmitting the sounding reference signal, and the sixth signaling is used for instructing the second communication node not to trigger the sounding reference signal, wherein the time-frequency resource position comprises at least one of: the starting physical resource block allocation position or the time-frequency position.

12. The apparatus of claim 9, wherein the first signaling, the second signaling, the third signaling, the fourth signaling, the fifth signaling, and the sixth signaling each comprise at least one of: radio resource control (RRC) signaling, medium access control element (MAC CE) signaling, or physical downlink control signaling.

* * * * *